Feb. 1, 1966 J. H. STANLEY 3,232,159
PORTABLE HOSE CUT-OFF MEANS
Filed Sept. 24, 1963 2 Sheets-Sheet 1
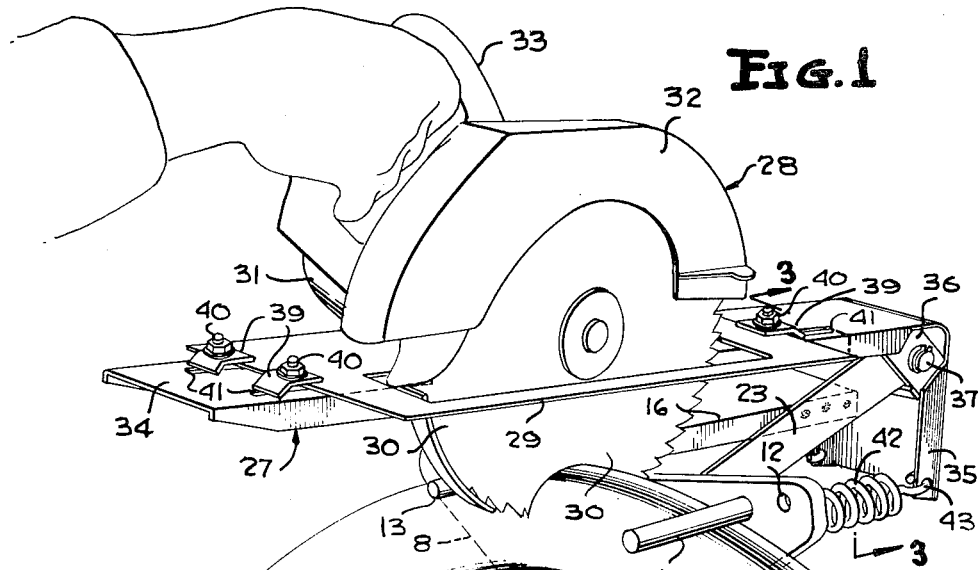
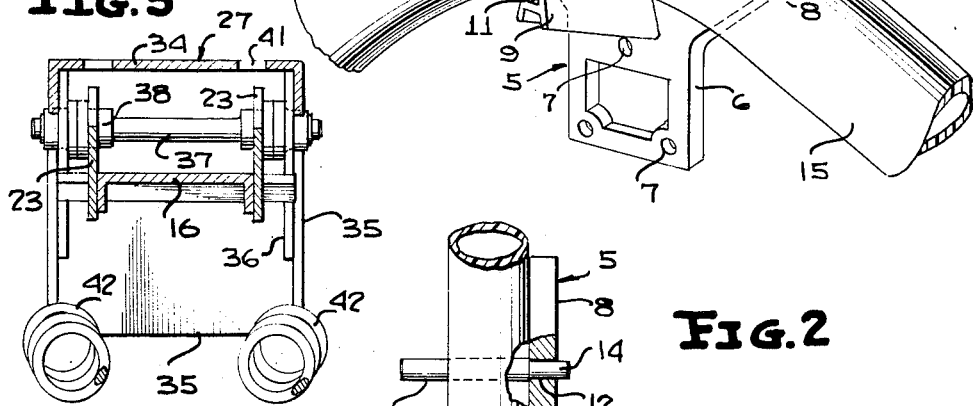
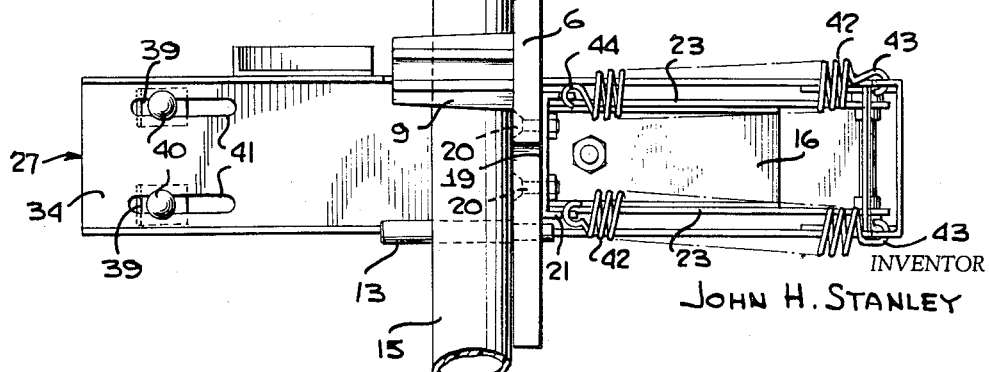
INVENTOR
JOHN H. STANLEY
BY
ATTORNEYS

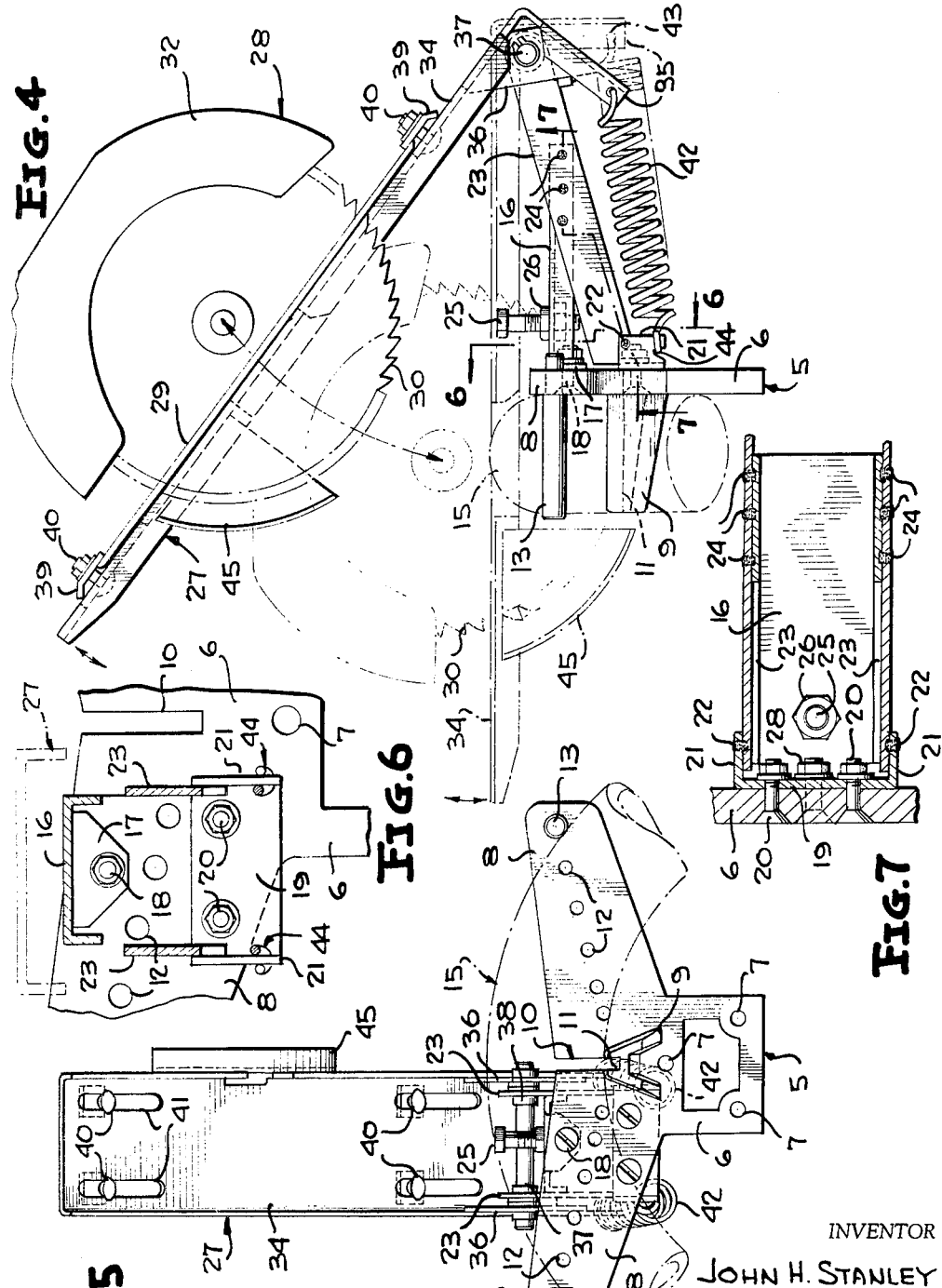

United States Patent Office 3,232,159
Patented Feb. 1, 1966

3,232,159
PORTABLE HOSE CUT-OFF MEANS
John H. Stanley, Euclid, Ohio, assignor to Parker-Hannifin Corporation, Cleveland, Ohio, a corporation of Ohio
Filed Sept. 24, 1963, Ser. No. 311,018
14 Claims. (Cl. 83—175)

The invention relates generally to tube cutting apparatus and primarily seeks to provide a simple and inexpensively constructed apparatus which is manually operable for efficiently cutting off lengths of hose.

More specifically, the invention seeks to provide a novel means for cutting off lengths of hose and employing a rotary cutter engageable with the hose for rapidly and efficiently effecting each cut. Difficulty has been encountered in the cutting off of hose lengths because of interference with the desired clean cutting by reason of friction incidental to the cutting action. Therefore, a purpose of the present invention is to provide an apparatus of the character stated wherein provision is made for holding the hose bent into an arc in the cutting area, thereby to facilitate separation of the cut faces of the hose from the side faces of the cutting wheel as the hose is being cut so as to avoid frictional drag on the wheel which may bind and stall the same, create excessive heat which may be detrimental to the cutting wheel and/or the hose, and chew up the cut faces of the hose.

An object of the invention is to provide a portable hose cutter of the character stated which is readily mountable in and removable from a bench vise or may be secured to other support and which includes a novel hose holder having provision for three point contact with the hose effective to present it in arcuate form opposite the rotary cutter, and means whereby relative movement may be brought about between the holder and the rotary cutter to cause an engagement of the cutter and the hose and the desired clean cutting through and severing of the hose length.

Another object of the invention is to provide a hose cutting means of the character stated wherein the hose holder is stationarily mountable and means are included for swingably supporting the rotary cutter for movement toward and from the hose engaging and cutting position.

A further object of the invention is to provide an apparatus of the character stated wherein there are included novel counterpoising means for normally holding the rotary cutter in its out-of-the-way position and for returning it to said position after each movement manually thereof to complete a hose cutting operation.

Yet another object of the invention is to provide an apparatus of the character stated wherein the means for holding a hose to-be-cut in arcuate position includes a central rest or support means over which the hose is engaged, and two supporting pins disposed one at each side of the central support means and under which the hose is engaged, said central support means having a central clearance into which the rotary cutter can pass as the cutting of each hose length is completed.

Still another object of the invention is to provide an apparatus of the character stated wherein the central rest or support means is carried on a plate having a laterally extending wing portion at each side of said central rest, each said wing portion having therein an upwardly and laterally inclined line of spaced, selective receiving recesses wherein to selectively receive a pin to provide one of the three point contacts effective for holding the hose length in arcuate position, selective placement of the two pins a greater or lesser distance from the central rest serving to condition the holder for the proper arcuate placement of hose lengths of different sizes or outside diameters.

With the above and other objects in view that will hereinafter appear, the nature of the invention will be more clearly understood by reference to the following detailed description, the appended claims and the several views illustrated in the accompanying drawings.

In the drawings:

FIGURE 1 is a perspective view illustrating the invention in use.

FIGURE 2 is an inverted plan view illustrating the cutting saw supporting devices and the hose holding means, parts being broken away and in section.

FIGURE 3 is a vertical cross section taken on the line 3—3 on FIGURE 1.

FIGURE 4 is a right side elevation, the rotary cutter unit carrying means being shown in the normal elevated position in full lines, and in the lowered, hose cutting position in dot and dash lines.

FIGURE 5 is a front elevation with the rotary cutter carrier elevated as in FIGURE 4.

FIGURE 6 is a fragmentary vertical cross section taken on the line 6—6 on FIGURE 4.

FIGURE 7 is a fragmentary horizontal section taken on the line 7—7 on FIGURE 4.

In the practical development of the invention, the improved portable hose cut-off apparatus is formed to include a mounting and hose or tube positioning unit generally designated 5 and comprising a mounting plate 6 having provision at 7 for ready attachment upon a bench or other support. The plate includes laterally and upwardly extending wing portions 8 and a central hose supporting bend rest 9. At the position of the rest 9 the plate is notched or slotted at 10, a registering slot or recess 11 also being provided in the rest 9. These clearances 10 and 11 provide rotary cutter clearances, as will be described in greater detail hereinafter.

Each plate wing 8 is equipped with a series of selective apertures 12 arranged in spaced relation with their axes in an upwardly and outwardly inclined line as best illustrated in FIGURE 5. The selective apertures 12 are disposed to selectively receive shouldered pins 13, the small mounting ends 14 of which are receivable in slide fit engagement in the apertures in the manner best illustrated in FIGURES 2 and 5. It will be apparent by reference to FIGURES 1 to 4 that in the positioning of a hose length to be cut, the same is engaged over the central rest 9 as indicated in dot and dash lines in FIGURE 5 and in full lines in FIGURE 1 and portions extending laterally to each side of the center rest portions are placed under the selectively positioned pins 13. With this particular arrangement of center rest 9 and selectively placed pins 13, it is possible to mount and efficiently cut hose lengths of different O.D. sections, the desired arcuate placement being arranged with the smallest practical distance between the last pair of the holes 12, or in other words the hole positions being utilized in the mounting of the pins 13 in FIGURE 5. It will be apparent that if all of the holes 12 were in a horizontal center line, rather than in two upwardly and outwardly extending lines as shown in FIGURE 5, the outermost holes in which the pins are located in FIGURE 5 would have to be spaced farther apart to produce the same curvature with a given size hose cross section. This arrangement also has the advantage that it increases the minimum length of hose that can be properly supported between the pins 13 for a cutting action by the rotary cutter over the center of the supporting rest 9. This is important because should it be desired to cut a hose length which is relatively short, say several inches, the least amount that could be cut off is the distance from the rotary cutter blade to one of the pins when the latter are in their proper holes for that size of hose. The pins should be in corresponding holes spaced at each side of the rotary cutter, otherwise the fixed arc or curvature of the hose will not be symmetrical on opposite sides of the rotary cutter and the cut off will not be directly perpendicular to the axis of the hose at the point of cut.

The improved apparatus herein disclosed is not only designed for quick mounting and detachment, so as to be portable, but it also is designed to support conventional forms of rotary cutters such as the well known power driven, hand manipulated rotary saw type. For this purpose, the means for supporting the rotary cutter unit is formed to include an inverted U-shaped support member 16 which has a downturned end portion bolt 17 secured at 18 to the plate 6, as best illustrated in FIGURES 4 and 6. A U-shaped support and anchor member 19 is bolt secured at 20 to the plate 6 beneath the member 19 and has its side extensions 21 secured by welding at 22 to the angularly disposed support plates 23 which are in turn welded at 24 to the sides of the member 16. It will also be observed by reference to FIGURES 4 and 5 that the member 19 also supports a stop screw 25 which is vertically adjustably mounted thereon as at 26.

A swingable rotary saw unit carrier is provided and is generally designated 27, and it is on this carrier that the selected conventional form of rotary cutter is removably attached, as clearly illustrated in FIGURES 1 and 4. The illustrated saw unit is generally designated 28 and is shown as including a base 29 on which the saw 30 and its drive motor 31, guard 32 and manipulating handle 33 are supported.

The rotary cutter unit carrier 27 includes an inverted U-shaped supporting bar 34 having a right angled, downturned end portion 35 which is reinforced by brace pieces or gussets 36 which are angularly disposed and weldsecured to the side flanges of the carrier parts 34 and 35. The pieces 36 serve as supports for a pivot shaft 37 having a bearing 38 in the free ends of the support plates 23. The rotary cutter unit 28 is readily detachably mounted on the carrier by employment of mounting clips 39 which are bolt secured at 40 in elongated slots provided on the bar 34. It will be noted that the mounting clips 39 engage over the end edges of the rotary cutter unit base 29 and the adjustment permitted by use of the slots 41 and bolts 40 provides for the use of a selection from various conventional forms of rotary saw cutter units.

Retractile coil springs 42 are anchored at their ends at 43 to the lower end extremities of the downturned end portion 35 of the carrier and at 44 to the side extensions 21 of the beforementioned anchor member 19, as best shown in FIGURES 1, 4 and 6. In addition to the usually provided upper guard 32, a guard 45 may be mounted to depend from one of the sides of the carrier 27, as best shown in FIGURES 1, 4 and 5.

When it is desired to utilize the herein disclosed apparatus in the cutting of hose or tubing, the plate 6 will, of course, be rigidly mounted on a bench or other support, and the pins 13 will be mounted in selected apertures 12 on the wing plates 8 in the manner previously described and in accordance with the size of tubing which is to be cut. The rotary cutter carrier will normally be held by the springs 42 in the elevated position illustrated in FIGURE 4, or in other words an out-of-the-way position which will permit proper manipulation of the hose to place the same in arcuate position over the center rest 9 and under the selectively positioned holddown pins 13—13. The hose or tube will be held in the desired downwardly arced or bowed position with the crest or high point of the arc disposed in the cutting plane directly over the center of the rest 9. By now grasping the handle 33, the operator can depress the carrier 27 and present the rotary cutting element, preferably a saw, to the hose 16 to cut the same in the manner illustrated in FIGURE 1. Upon releasing of the pressure on the handle 33 after completion of the perpendicular, across-the-axis cutting of the hose, the carrier 27 will swing up to its normal out-of-the-way position illustrated in full lines in FIGURE 4.

While a simple preferred form of the portable carrier apparatus is disclosed herein it is to be understood that changes in part structure and arrangement may be made without departing from the spirit and scope of the invention as defined in the appended claims.

I claim:

1. A portable mounting for a hose cutting apparatus comprising: a plate including a central rest over which the hose to be cut is engageable and two pins disposed one at each side of said rest and under which said hose is engageable, said plate being provided with means for facilitating its rapid mounting upon or removal from a siutable support; cutter means; means mounted on said plate for mounting said cutter means for pivotal movement towards and away from said plate; and means for adjustably positioning said pins selected distances from the rest, thereby to adapt the holder for arcuately placing hose lengths of various outside diameters of cross section, said last named means including a line of apertures spaced varying distances from the rest at each side thereof in the plate, the pins being selectively receivable in said apertures.

2. A portable mounting for a hose cutting apparatus as defined in claim 1, wherein said central rest and plate have a clearance into which the cutting means can pass as the cutting of each hose length is completed.

3. A portable mounting for a hose cutting apparatus as defined in claim 1, wherein the cutter means includes a base and the means for mounting said cutter means includes a support bar fixed to and projecting from said plate, a carrier swingably supported on said bar for movement toward and away from said plate, and stop means limiting the movement of the carrier toward said plate.

4. A portable mounting for a hose cutting apparatus as defined in claim 1, wherein the cutter means includes a base and the means for mounting said cutter means includes a support bar fixed to and projecting from said plate, a carrier swingably supported on said bar for movement toward and away from said plate, and means constantly tending to move the carrier away from said plate.

5. A portable mounting for a hose cutting apparatus as defined in claim 1, wherein the cutter means includes a base and the means for mounting said cutter means includes a support bar fixed to and projecting from said plate, a carrier swingably supported on said bar for movement toward and away from said plate, stop means limiting movement of the carrier toward said plate, and retractile spring means connected between the plate and the carrier and constantly tending to move the carrier away from said plate.

6. A portable mounting for a hose cutting apparatus as defined in claim 1, wherein the cutter means includes a base and the means for mounting said cutter means includes a support bar fixed to and projecting from said plate, a carrier swingably supported on said bar for movement toward and away from said plate, and means for removably securing said base and the cutter means on said carrier.

7. A portable mounting for a hose cutting apparatus as defined in claim 6, wherein said means for removably securing said base and the cutter means on said carrier comprise rapidly releasable clips affixed to said carrier by bolts passing through slots in said carrier.

8. A portable mounting for a hose cutting apparatus as defined in claim 7, wherein there is further included stop means limiting the movement of the carrier toward said plate.

9. A portable mounting for a hose cutting apparatus as defined in claim 7, wherein there is further included retractile spring means connected between the plate and the carrier and constantly tending to move the carrier away from said plate.

10. A portable mounting for a hose cutting apparatus as defined in claim 8, wherein there is further included retractile spring means connected between the plate and the carrier and constantly tending to move the carrier away from said plate.

11. In a hose cutting apparatus, means for holding a hose length in arcuate form with the crest of the arc at the point at which a cut is to be made, means for cutting the hose, and means mounting the holding means and the cutting means for relative movement effective to cause the cutting means to cut through the hose at said cutting point, the said holding means comprising a support plate including a central rest over which the hose to be cut is engageable, and two supporting pins disposed one at each side of the rest and under which said hose is engageable, and there also being included means for adjustably positioning said pins selected distances from the rest, thereby to adapt the holder for arcuately placing hose lengths of various outside diameters of cross section, said last named means including a line of spaced apertures spaced varying distances from the rest at each side thereof in the plate, the pins being selectively receivable in said apertures, and each line of said apertures bearing an upwardly and laterally inclined relation to the rest at one side thereof.

12. In a hose cutting apparatus, means for holding a hose length in arcuate form with the crest of the arc at the point at which a cut is to be made, means for cutting the hose, and means mounting the holding means and the cutting means for relative movement effective to cause the cutting means to cut through the hose at said cutting point, said holding means comprising a support plate including a central rest over which the hose to be cut is engageable, and two supporting pins disposed one at each side of the rest and under which said hose is engageable, there also being included means for adjustably positioning said pins selected distances from the rest, thereby to adapt the holder for arcuately placing hose lengths of various outside diameters of cross section, said last named means including a line of spaced apertures spaced varying distances from the rest at each side thereof in the plate, the pins being selectively receivable in said apertures and each line of said apertures bearing an upwardly and laterally inclined relation to the rest at one side thereof, and said central rest and plate having clearances therein into which cutter means can pass as the cutting of each hose length is completed.

13. In a hose cutting apparatus, means for holding a hose length in arcuate form with the crest of the arc at the point at which a cut is to be made, rotary cutter means, and means supporting the cutter means for movement toward and away from the holding means for alternatively presenting the cutter means to the hose to cut therethrough at said cutting point and withdrawing the same to an out of the way position, said rotary cutter means including a base and said means for supporting said cutter means including a support plate, a support bar fixed to and projecting from said plate, a carrier swingably supported on said bar for movement toward and away from said plate, stop means limiting movement of the carrier toward said plate, means constantly tending to move the carrier away from said plate, and said hose length holding means including a central rest projecting from the plate and over which the hose to be cut is engageable, and two supporting pins disposed one at each side of the rest and under which said hose is engageable, each said pin being selectively mountable in apertures formed in the plate and arranged in spaced relation in an upwardly and laterally extending line at one side of the center rest.

14. In a hose cutting apparatus, means for holding a hose length in arcuate form with the crest of the arc at the point at which a cut is to be made, rotary cutter means, and means supporting the cutter means for movement toward and away from the holding means for alternately presenting the cutter means to the hose to cut therethrough at said cutting point and withdrawing the same to an out of the way position, said rotary cutter means including a base and said means for supporting said cutter means including a support plate, a support bar fixed to and projecting from said plate, a carrier swingably supported on said bar for movement toward and away from said plate, stop means limiting movement of the carrier toward said plate, means constantly tending to move the carrier away from said plate, said hose length holding means including a central rest projecting from the plate and over which the hose to be cut is engageable, and two supporting pins disposed one at each side of the rest and under which said hose is engageable, each said pin being selectively mountable in apertures formed in the plate and arranged in spaced relation in an upwardly and laterally extending line at one side of the center rest, and said central rest and plate having clearances therein into which the rotary cutter means can pass as the cutting of each hose length is completed.

References Cited by the Examiner
UNITED STATES PATENTS

| | | | |
|---|---|---|---|
| 1,144,867 | 6/1915 | Rothman | 143—46 |
| 1,745,699 | 2/1930 | Kleeb et al. | 143—46 X |
| 2,064,017 | 12/1936 | Leschen | 143—46 X |
| 2,293,721 | 8/1942 | Engler | 83—20 |
| 2,842,168 | 7/1958 | Truchan | 143—46 |
| 2,925,005 | 2/1960 | Hensley | 83—456 X |
| 2,946,250 | 7/1960 | Bahr | 83—176 |
| 3,066,564 | 12/1962 | Carpenter | 83—175 |

WILLIAM W. DYER, Jr., *Primary Examiner.*

ANDREW R. JUHASZ, *Examiner.*